(12) United States Patent
Basso et al.

(10) Patent No.: US 10,103,830 B2
(45) Date of Patent: *Oct. 16, 2018

(54) LATENCY-OPTIMIZED PHYSICAL CODING SUBLAYER

(71) Applicant: International Business Machines Corporation, Armonk, NY (US)

(72) Inventors: Claude Basso, Nice (FR); Cheng Wei Song, Beijing (CN); Fabrice Jean Verplanken, la Gaude (FR)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/299,217

(22) Filed: Oct. 20, 2016

(65) Prior Publication Data

US 2017/0041094 A1 Feb. 9, 2017

Related U.S. Application Data

(63) Continuation of application No. 14/445,294, filed on Jul. 29, 2014, now Pat. No. 9,515,817, which is a (Continued)

(51) Int. Cl.
  *H04L 7/06* (2006.01)
  *H04J 3/06* (2006.01)
  (Continued)

(52) U.S. Cl.
  CPC .......... *H04J 3/0697* (2013.01); *H04L 1/0018* (2013.01); *H04L 7/0016* (2013.01);
  (Continued)

(58) Field of Classification Search
  CPC ..... G06F 1/04; G06F 1/06; G06F 1/10; G06F 3/00; H04L 7/00–7/005
  See application file for complete search history.

(56) References Cited

U.S. PATENT DOCUMENTS

| | | |
|---|---|---|
| 6,871,301 B1 | 3/2005 | Deng |
| 6,999,542 B1 | 2/2006 | Korger et al. |

(Continued)

FOREIGN PATENT DOCUMENTS

| | | |
|---|---|---|
| WO | 2007125519 A2 | 11/2007 |

OTHER PUBLICATIONS

List of IBM Patents or Patent Applications Treated As Related for U.S. Appl. No. 15/299,217, filed May 4, 2018.

(Continued)

*Primary Examiner* — Pao Sinkantarakorn
(74) *Attorney, Agent, or Firm* — Patterson + Sheridan, LLP

(57) ABSTRACT

A method for reducing latency in a networking application includes receiving data at a physical coding sublayer (PCS) from a media access control (MAC) sublayer, where the MAC sublayer utilizes a first clock domain operating at a first clock frequency. The method further includes performing one or more functions in the PCS on the data in the first clock domain. The method also includes transmitting the data on one or more physical medium attachment (PMA) lanes, where the one or more PMA lanes utilize a second clock domain operating at a second clock frequency, where the first clock frequency and the second clock frequency have a fixed ratio. The data is transmitted from the first clock domain to the second clock domain without buffering the data. The method also includes performing one or more functions in the PCS on the data in the second clock domain.

9 Claims, 5 Drawing Sheets

Related U.S. Application Data continuation of application No. 14/319,031, filed on Jun. 30, 2014, now Pat. No. 9,515,816.

(51) Int. Cl.
  *H04L 7/00* (2006.01)
  *H04L 25/14* (2006.01)
  *H04L 1/00* (2006.01)
  *H04L 12/863* (2013.01)

(52) U.S. Cl.
  CPC .............. *H04L 7/0037* (2013.01); *H04L 7/06* (2013.01); *H04L 25/14* (2013.01); *H04L 47/6245* (2013.01)

(56) References Cited

U.S. PATENT DOCUMENTS

| | | | |
|---|---|---|---|
| 8,411,703 B1 | 4/2013 | Cory | |
| 9,515,816 B2 | 12/2016 | Basso et al. | |
| 9,515,817 B2 | 12/2016 | Basso et al. | |
| 2005/0063502 A1 | 3/2005 | Ware et al. | |
| 2006/0282808 A1 | 12/2006 | Byrn et al. | |
| 2007/0220184 A1 | 9/2007 | Tierno | |
| 2007/0234172 A1* | 10/2007 | Chiabrera | H04L 1/0043 714/752 |
| 2008/0250258 A1* | 10/2008 | Kuo | G06F 1/3209 713/322 |
| 2009/0271651 A1 | 10/2009 | Pothireddy et al. | |
| 2011/0204932 A1 | 8/2011 | Cortadella et al. | |
| 2013/0111083 A1* | 5/2013 | Wu | G06F 13/4291 710/52 |
| 2015/0304248 A1* | 10/2015 | Masood | H04L 12/4013 370/390 |

OTHER PUBLICATIONS

Tiberiu Chelcia et al., "A Low-Latency FIFO for Mixed-Clock Systems," Department of Computer Science, Columbia University, IEEE, 2000, 8 pages. cited byapplicant.

* cited by examiner

LATENCY-OPTIMIZED PHYSICAL CODING SUBLAYER

CROSS-REFERENCE TO RELATED APPLICATIONS

This application is a continuation that claims priority from U.S. patent application Ser. No. 14/445,294, filed Jul. 29, 2014, entitled "Latency-Optimized Physical Coding Sublayer," which is a continuation of U.S. patent application Ser. No. 14/319,031, filed Jun. 30, 2014, entitled "Latency-Optimized Physical Coding Sublayer." The aforementioned related patent applications are herein incorporated by reference in their entirety.

BACKGROUND

The present invention relates to reducing latency, and more specifically, to reducing latency in Ethernet systems with multiple clock domains. The Ethernet physical layer is developed according to the Open Systems Interconnection (OSI) model. Several layers are defined in the various Ethernet standards, including the Physical Layer (PHY). The Ethernet Physical Coding Sublayer (PCS) is part of the Ethernet PHY layer and performs autonegotiation, coding, and other functions.

Latency is a critical parameter in many networking applications, such as financial applications. 40G and 100G Ethernet is more complex than 10G Ethernet, in part due to 64b/66b line coding instead of 8b/10b. Typical Ethernet implementations follow the IEEE functional definition which includes three clock domains (Media Access Control (MAC) Interface, PCS Core, and Link Interfaces). In addition, multiple data reformattings are performed. These data reformattings and clock boundary crossings contribute to a relatively large amount of latency in the system.

SUMMARY

According to one embodiment of the present invention, a method comprises receiving data at a physical coding sublayer (PCS) from a media access control (MAC) sublayer, wherein the MAC sublayer utilizes a first clock domain operating at a first clock frequency. The method further includes performing one or more functions on the data in the first clock domain. The method also comprises transmitting the data on one or more physical medium attachment (PMA) lanes, wherein the one or more PMA lanes utilize a second clock domain operating at a second clock frequency, wherein the first clock frequency and the second clock frequency have a fixed ratio. The data is transmitted from the first clock domain to the second clock domain without buffering the data. The method further includes performing one or more functions on the data in the second clock domain.

BRIEF DESCRIPTION OF THE SEVERAL VIEWS OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

Figure 1:
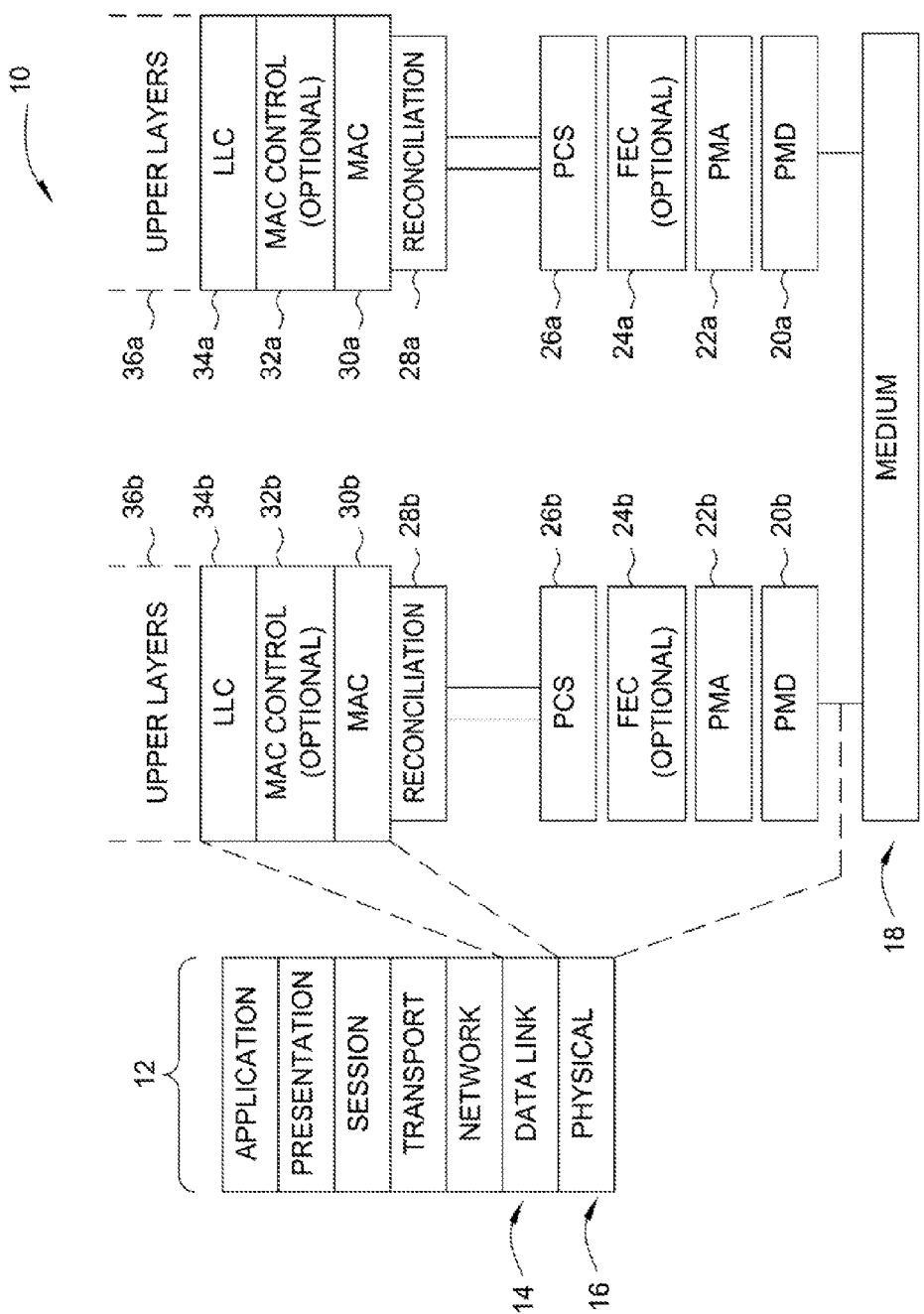
FIG. 1 illustrates a conceptual block diagram of an Ethernet networking application according to one embodiment described herein.

As transmit speeds of Ethernet applications have increased, such as 40G and 100G Ethernet, the complexity of various cores (i.e., sublayers) have increased as well. One function of the PCS is to encode/decode data and perform clock compensation functions. In many Ethernet applications, data is transmitted from the MAC layer to the PHY layer. The first module of the PHY layer is the PCS. In standard Ethernet implementations, data is transmitted from the clock domain of the MAC core (the MAC Interface (MI) clock) to the clock domain of the PCS core (the PMA clock). A large data buffer is used to synchronize data transmissions from the MAC core to the PCS core. In one embodiment of the present invention, the PMA clock frequency and the MI clock frequency are defined using the same phase-locked loop (PLL), and therefore there is a fixed ratio between the two clocks. With a known fixed ratio, the large buffer is not needed to buffer data between the two clock domains, and latency is reduced. Further reductions in latency can be achieved through modifications on the receive (RX) PCS structure. In some embodiments, latency of 400-500 ns in a standard implementation is reduced to about 60 ns.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the following, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention"

shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

FIG. 1 illustrates a conceptual block diagram 10 of an Ethernet application. On the left side of FIG. 1 are the OSI Model layers 12. The OSI Model characterizes and standardizes the internal functions of a communications system by partitioning it into abstraction layers. The PHY layer 16 is shown at the bottom of the OSI Model 12, with the Data Link layer 14 situated above the PHY layer 16.

Elements 20a to 36a and 20b to 36b illustrate various sublayers of an Ethernet application. Elements 20a to 36a represent a transmit side, and elements 20b-36b represent a receive side. A medium 18 connects the transmit and receive sides. Different elements, layers, or sublayers may reside on different chips in certain embodiments. In some embodiments various combinations of the elements may be implemented together on a single chip.

Data may travel through block diagram 10 from the transmit side to the receive side. Data traverses the upper layers 36a, which may comprise the application layer, transport layer, network layer, etc. Data then reaches the data link layer 12, comprising a logical link control (LLC) 34a, an optional MAC control 32a, and a MAC sublayer 30a. Data then enters the PHY layer 12, comprising Reconciliation 28a, a PCS 26a, an optional FEC sublayer 24a, a PMA sublayer 22a, and Physical Medium Dependent sublayer (PMD) 20a. Reconciliation 28a processes fault messages and may perform other operations.

Data travels from the transmit side to the receive side via medium 18, which may comprises a High-Speed SerDes (serializer/deserializer), or HSS. On the receive side, represented by elements 20b-36b, the data moves through the various sublayers in the opposite direction from the transmit side, beginning with the PMD 20b and traversing up the figure, eventually reaching the upper layers 36b. A number of clock domains may be used by the various layers and sublayers.

Figure 2:
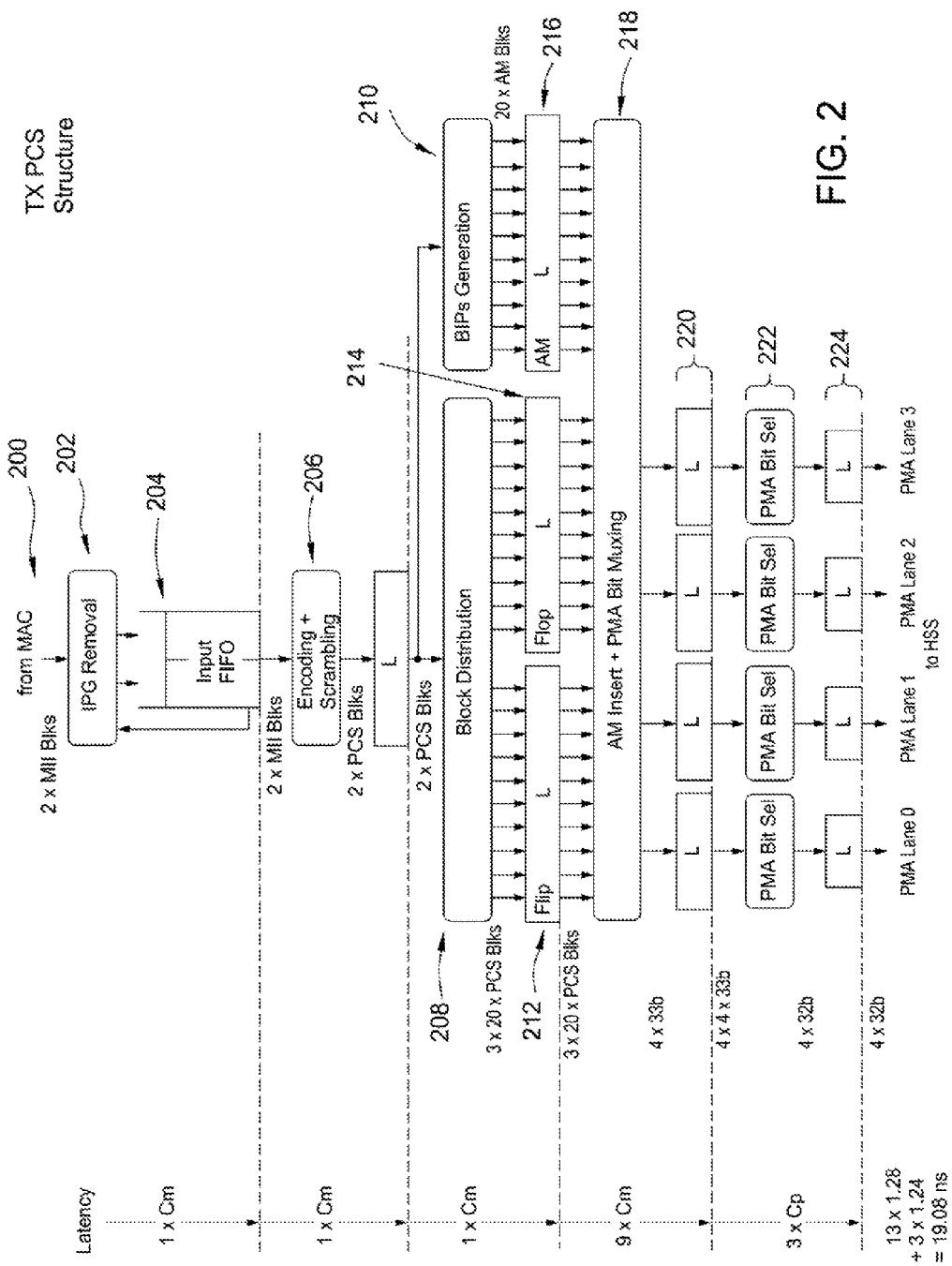
FIG. 2 illustrates a transmit (TX) PCS structure according to one embodiment described herein.

Referring to FIG. 2, PCS TX structure 200 is illustrated according to one embodiment of the present invention. On the left side of FIG. 2, an axis illustrates approximate latencies for various processes performed on the PCS TX side. An MI clock cycle is represented by Cm, and a PMA clock cycle is represented by Cp. Different processes are separated on the Figure by horizontal dashed lines. As seen in this example embodiment, the top four processes are performed in the MI clock domain (as noted by the Cm label), and the bottom process is performed in the PMA clock domain (as noted by the Cp label).

In a PCS sublayer for 40G and 100G Ethernet, 64-bit blocks of data are transmitted as a 66-bit entity (known as 64b/66b encoding). The 66-bit entity in the PCS core comprises the 64 bits of data and a 2-bit preamble, either '01' or '10.' First, however, a data stream is received from the MAC sublayer as two Media Independent Interface (MIT) blocks, as shown in FIG. 2. These MIT blocks comprise 64 bits of data plus 8 bits of control code. Interpacket gap (IPG) Removal Module 202 performs interpacket gap removal after the MIT blocks are received. An input FIFO 204 stores the data. In one embodiment, the depth of the input FIFO is 20 blocks.

Encoder 206 encodes the MIT blocks into two 66-bit PCS blocks. To do so, encoder 206 encodes the 64 bits of MAC data and 8 bits of MAC control data into a 64-bit block that includes a 2-bit preamble to create the 66-bit PCS block. Encoder 206 performs a scrambling function to create a roughly equal number of 1s and 0s on the physical lane. The scrambling function works to prevent a long string of all 1s or all 0s being transmitted. As shown on the latency axis in FIG. 2, the encoding and scrambling functions take approximately 1 MI clock cycle to complete.

The next step comprises Block Distribution 208 and Bit Interleaved Parity (BIP) Generation, which provides a parity check. Further, alignment markers (AM) are utilized on the receive side of the PCS sublayer (illustrated in FIG. 3 below) to synchronize the PCS blocks transmitted amongst the various PMA lanes 224. Parity bits also accompany the alignment markers to perform parity checks. Alignment markers allow the receive side of the PCS sublayer to identify the PCS blocks as the blocks are received on the receive side from the PMA lanes 224 so that the PCS blocks can be reordered and put into the proper order. Alignment markers are 66-bit blocks inserted into the stream of PCS blocks in each PMA lane.

During each Cp clock cycle in the PCS transmit structure 200, 32 bits of data are transmitted on each PMA lane 224. Multiplexer 218 uses muxing logic to prepare for converting the 66-bit PCS blocks to be converted into 32 bits. The muxing logic in multiplexer 218 receives 40 PCS blocks of data and outputs 32-bit blocks. Therefore, flip flops 212 and 214 store PCS blocks before muxing functions are performed. Block distribution 208 transmits 66-bit PCS blocks to flip flops 212 and 214, where each flip flop stores 20 PCS blocks. Alignment marker generator 210 generates 20 AM blocks stored in AM register 216. Alignment marker generator 210 also generates the BIP bits described above.

Multiplexer 218 performs alignment marker insertion by interleaving the AM blocks with the PCS blocks. The interleaved AM and PCS blocks are output by Multiplexer 218 to a gearbox 220 for each PMA lane 224. In this example embodiment, four PMA lanes 224 are illustrated. In other embodiments, a different number of PMA lanes 224 may be used.

As seen on the latency axis on the left side of FIG. 2, data crosses from the MI clock domain (Cm) to the PMA clock domain (Cp) when gearbox 220 sends the data to PMA Bit Select 222. Because the MI and PMA clock domains have a fixed ratio, 33 PMA clock cycles pass for every 32 MI clock cycles that pass. Therefore, gearbox 220 (in the MI clock domain) sends data to PMA Bit Select 222 (in the PMA clock domain) during 32 of the 33 PMA clock cycles. At every PMA clock cycle, PMA Bit Select 222 receives 33 bits of data. However, the PMA Bit Select 222 forwards only 32 of the 33 bits of data on the PMA lane 224 during each clock cycle. Therefore, there is one bit left over on each PMA lane 224 for each Cm clock cycle. After 32 Cm clock cycles, a full 32 bit block of data will be left over. Because the PMA clock domain has 33 clock cycles for every 32 cycles of the MI clock domain no data is received from the MI clock domain on the $33^{rd}$ PMA clock cycle, and thus, the leftover 32 bits of data can be sent out during the $33^{rd}$ clock cycle of the PMA domain. Data on the PMA lanes 224 can then be transmitted to an HSS where the data is transmitted to the receive side of the PCS, as illustrated in FIG. 3 below.

Because of the known fixed ratio between the MI clock frequency and the PMA clock frequency, large data buffers are not needed for data reformatting and for buffering the data during clock boundary crossings. In previous embodiments, a data buffer was needed for buffering and synchronizing data when the data crossed from one clock domain to the next. For example, data buffers and synchronization logic would be needed between multiplexer 218 and PMA Bit Select 222 to synchronize data as it crossed from the MI clock domain to the PMA clock domain. Because the MI clock frequency and the PMA clock have a known fixed ratio in this example embodiment, the PCS TX Structure 200 performs the operations described above to transmit the data across the clock boundary without the need for data buffering at the clock boundary crossing. The only data buffering point in the example embodiment illustrated in FIG. 2 is the data buffering point for block distribution and alignment marker generation and insertion. Removing some of the previous data buffering operations by reducing the number of asynchronous clock domains reduces the latency in the system.

As seen in the example embodiment of FIG. 2, the total latency is approximately 12 MI clock cycles and 3 PMA clock cycles, which introduces about 19 ns of latency on the transmit side. This amount of latency is an improvement over standard Ethernet implementations.

Figure 3:
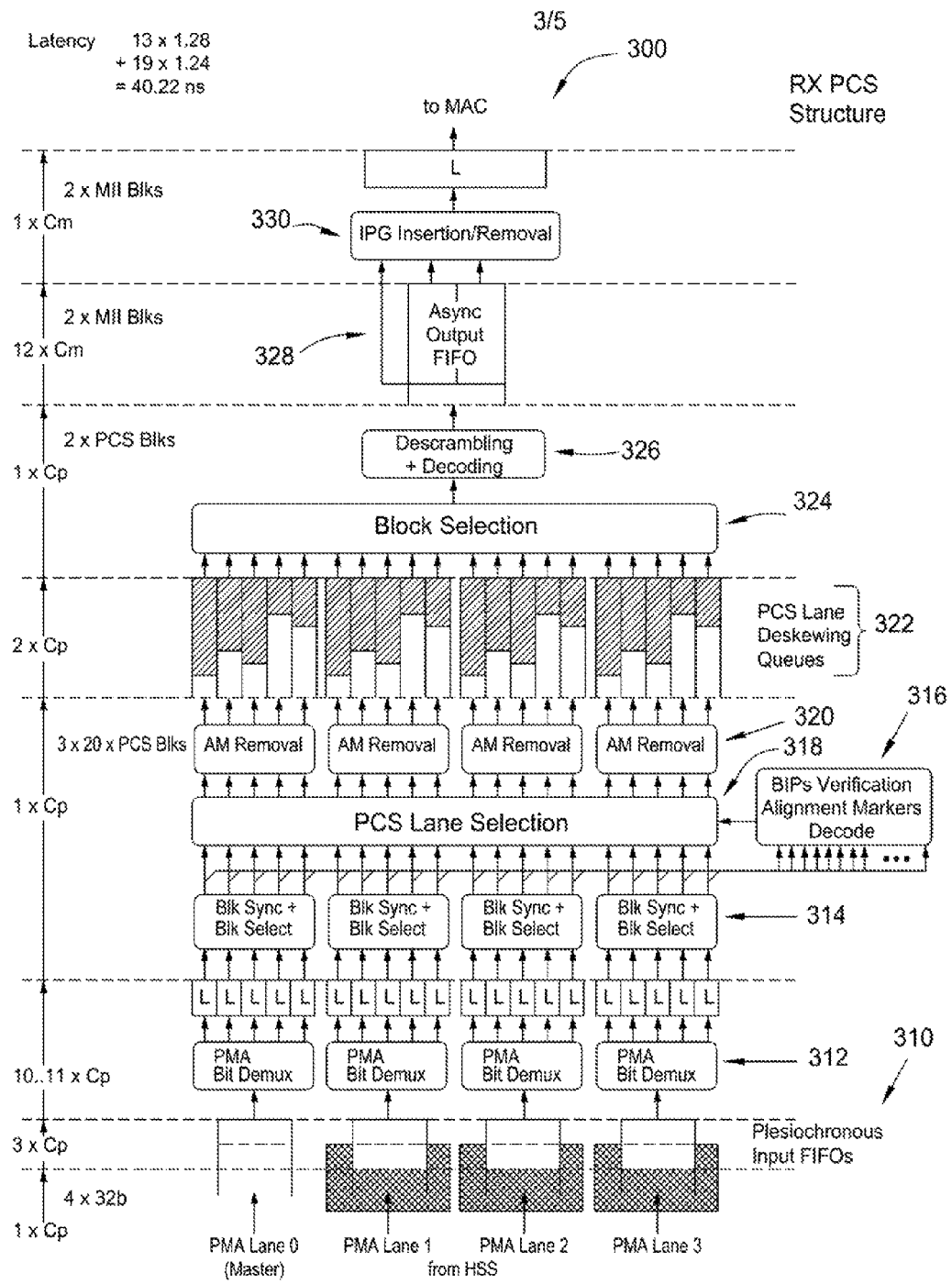
FIG. 3 illustrates a receive (RX) PCS structure according to one embodiment described herein.

Referring now to FIG. 3, a PCS RX structure 300 is illustrated according to one embodiment of the present invention. On the left side of FIG. 3, an axis illustrates approximate latencies for various processes performed on the PCS RX structure 300. As with the TX structure 200, an MI clock cycle is represented by Cm, and a PMA clock cycle is represented by Cp. As shown on the latency axis, the top two processes, separated by horizontal dashed lines, are labeled with Cm, and therefore those processes occur in the MI clock domain. The bottom six processes are labeled with Cp, and therefore those processes occur in the PMA clock domain.

Starting at the bottom of FIG. 3, 32-bit blocks of data are received from an HSS on four PMA lanes. The operations at the bottom of FIG. 3 are performed in the PMA clock domain, as illustrated on the latency axis. In one embodiment, the transmissions on the PMA lanes are not completely in sync. In other words, the four lanes do not necessarily have a known relationship for their respective clock cycles, so data transmitted on the PMA lanes cannot be sent directly to the next function. First, the data must be synchronized. Therefore, plesiochronous input FIFOs 310 are used.

In the Ethernet protocol, the latencies between different PMA lanes are not necessarily the same. That is, an alignment marker on PMA lane 0 may be received at a different time than an alignment marker on PMA lane 1, 2, or 3. In addition, as an example, the time difference between a first alignment marker on PMA lane 0 and a first alignment marker on PMA lane 1 may be 6 ns. For the second alignment markers on PMA lane 0 and lane 1, the difference may increase to 10 ns or decrease to 2 ns. There may be a skew variance between the lanes of approximately 4 ns.

Some amount of tolerance is defined in the Ethernet protocol for skew and for skew variance. The maximum skew variance to support according to the protocol is 4 ns. Because of this potential skew variance, the data cannot be treated as if it is from the same clock domain. However, the plesiochronous FIFOs 310 can move the data on PMA lanes 1, 2, and 3 from their clock domains to the clock domain of line 0, so all the data can then be considered as coming from the same clock domain. The plesiochronous FIFOs 310 are therefore used to synchronize data that is not in sync. The process of synchronizing the data using plesiochronous FIFOs 310 can take approximately 3 PMA clock cycles, as illustrated on the latency axis on the left side of FIG. 3.

The next step on the receive side 300 is PMA Bit Demux 312. Because multiplexing was performed on the transmit side, the Demux 312 performs demultiplexing on the receive side 300. As shown on the latency axis on the left side of FIG. 3, the demultiplexing operations can take approximately 10 to 11 PMA clock cycles After demultiplexing, Block sync and Block Select functions 314 reorder the data using the received alignment marker blocks. In addition, BIP Verification logic 316 performs parity checks and PCS Lane Selection logic 318 distributes PCS blocks amongst the transmission lanes. Alignment marker removal modules 320 strip the AM blocks from the data received from the PCS TX structure before the data reaches PCS Lane Deskewing Queues 322.

For PCS lane deskewing, the PCS Lane Deskewing Queues 320 may include 20 lanes formed into four groups. Because the alignment markers are received at different points in time, different levels are shown in the queues 322 in FIG. 3 to represent different levels of data. The position of the data boundary is therefore variable from lane-to-lane or from group-to-group. The queues 322 remove the skew so the 20 lanes of data can be read out on a single clock cycle with all the lanes aligned with one another. Approximately 2 PMA clock cycles are needed to perform this deskewing operation as shown in the latency axis.

Block selection 224 selects the data, and then descrambler 226 descrambles and decodes the data to reverse the encoding and scrambling performed in the PCT TX structure 200 illustrated in FIG. 2. These processes take approximately 1 PMA clock cycle as shown on the latency axis.

The Descrambler 326 sends MIT blocks to the Asynchronous Output FIFO 328 which is part of the MI clock domain. Therefore, the data crosses from the PMA clock domain to the MI clock domain at this point, where the Descrambler 326 outputs two MIT blocks. In one embodiment, the asynchronous FIFO 328 on the receive side 300 is larger than the asynchronous FIFO 204 on the transmit side 200 shown in FIG. 2. For example, some data received from the PMA clock domain on the receive side may be redundant data that is deleted to keep the throughput to the MI clock domain consistent. Asynchronous FIFO 328 has a depth of 20 blocks to absorb a glitch caused by the removal of alignment markers, plus one block to accommodate throughput differences between the PMA and the MI clock domains. This process can take approximately 12 MI clock cycles, as shown on the latency axis.

In previous embodiments, a large data buffer was used to buffer and synchronize the data as it crossed from the PMA clock domain to the MI clock domain. That large data buffer is not needed in this example embodiment, due to the known ratio of the two clock domains.

IPG Insertion/Removal module 330 performs IPG functions before the data is sent to the MAC sublayer through a MI interface. This process takes approximately 1 MI clock cycle.

As shown in the example embodiment of FIG. 3, the total latency of the RX PCS structure is approximately 13 MI clock cycles and 19 PMA clock cycles, which introduces about 40 ns of latency on the receive side. Therefore, as shown in FIGS. 2 and 3, the total latency of the PCS core is about 60 ns. Some embodiments may include additional latency due to skew that could reach as high as 180 ns. Latency in standard Ethernet implementations may reach approximately 500 ns, and therefore embodiments of the present invention provide a substantial improvement, even with a large amount of skew latency added.

Figure 4:
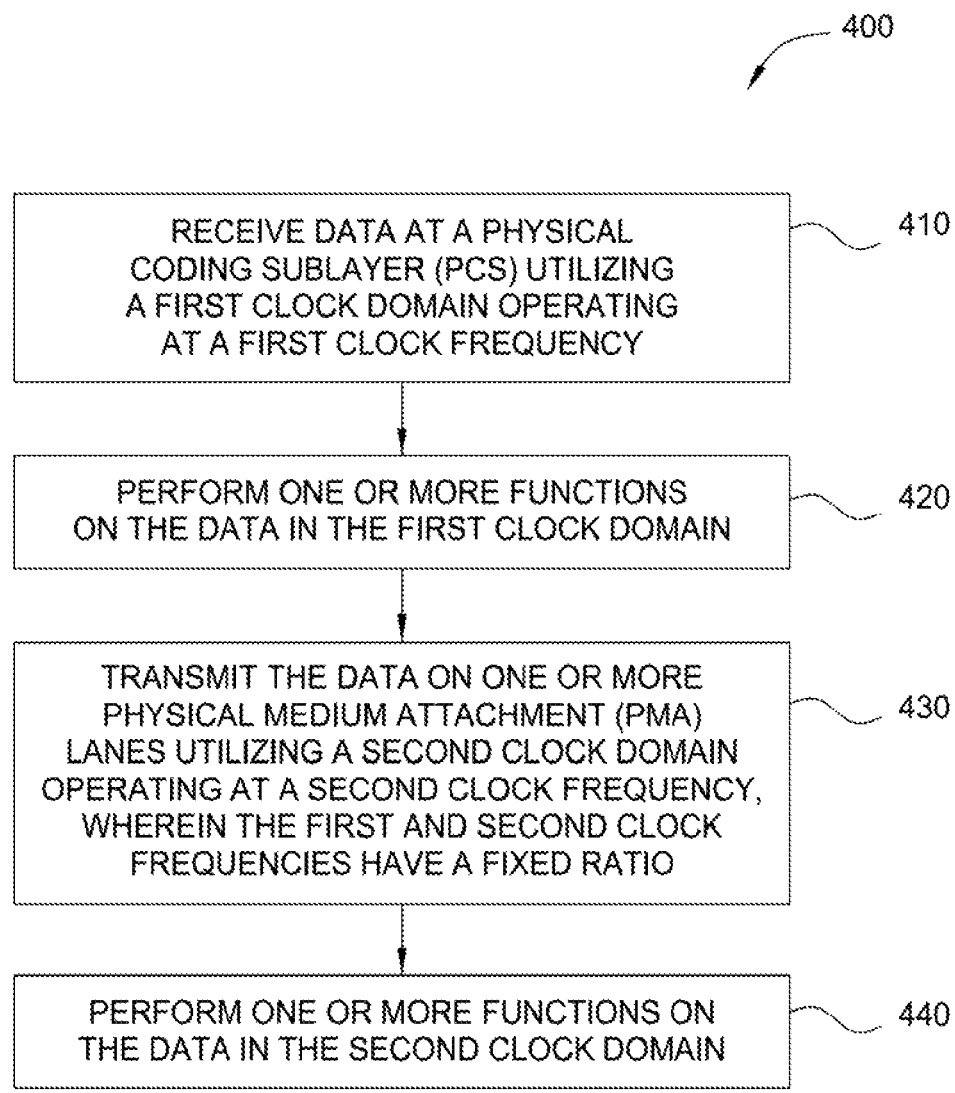
FIG. 4 is a flow diagram of method steps for reducing latency in Ethernet applications, according to one embodiment described herein.

FIG. 4 is a flow diagram of method steps 400 for reducing latency in Ethernet applications, according to one embodiment of the present invention. Although the method steps are described in conjunction with FIGS. 1-3, persons skilled in the art will understand that any system configured to perform the method steps, in any order, falls within the scope of the present invention. In various embodiments, the hardware and/or software elements described above in FIGS. 1-3 can be configured to perform the method steps of FIG. 4.

As shown, a method 400 begins at step 410, where data is received at a PCS TX core utilizing a first clock domain at a first clock frequency. As illustrated in the example embodiment of FIG. 2, data from the MAC sublayer is received at the transmit side of the PCS core. In this example, the first clock domain is the MI clock domain.

At step 420, one or more functions are performed on the data in the first clock domain. As described in FIG. 1 above, these functions may include storing the data in an input FIFO, encoding and/or scrambling the data, distributing the data into blocks, generating parity bits, or inserting alignment markers.

At step 430, PMA lanes transmit data utilizing a second clock domain operating at a second clock frequency, wherein the first and second clock frequencies have a fixed ratio. In the example embodiment of FIG. 2, the second clock domain is the PMA clock domain. In addition, the second clock frequency and the first clock frequency have a ratio of 33:32. Therefore, 33 clock cycles pass on the PMA clock domain for every 32 cycles in the MI clock domain. In one embodiment, because of the fixed ratio between the two clock domains, large data buffers are not needed to buffer and synchronize the data at the clock boundary crossings.

At step 440, one or more functions are performed on the data in the second clock domain. As illustrated in the example embodiment in FIG. 3, these functions may include synchronizing data using plesiochronous FIFOs, demultiplexing data, removing alignment markers, deskewing, and descrambling or decoding data.

Figure 5:
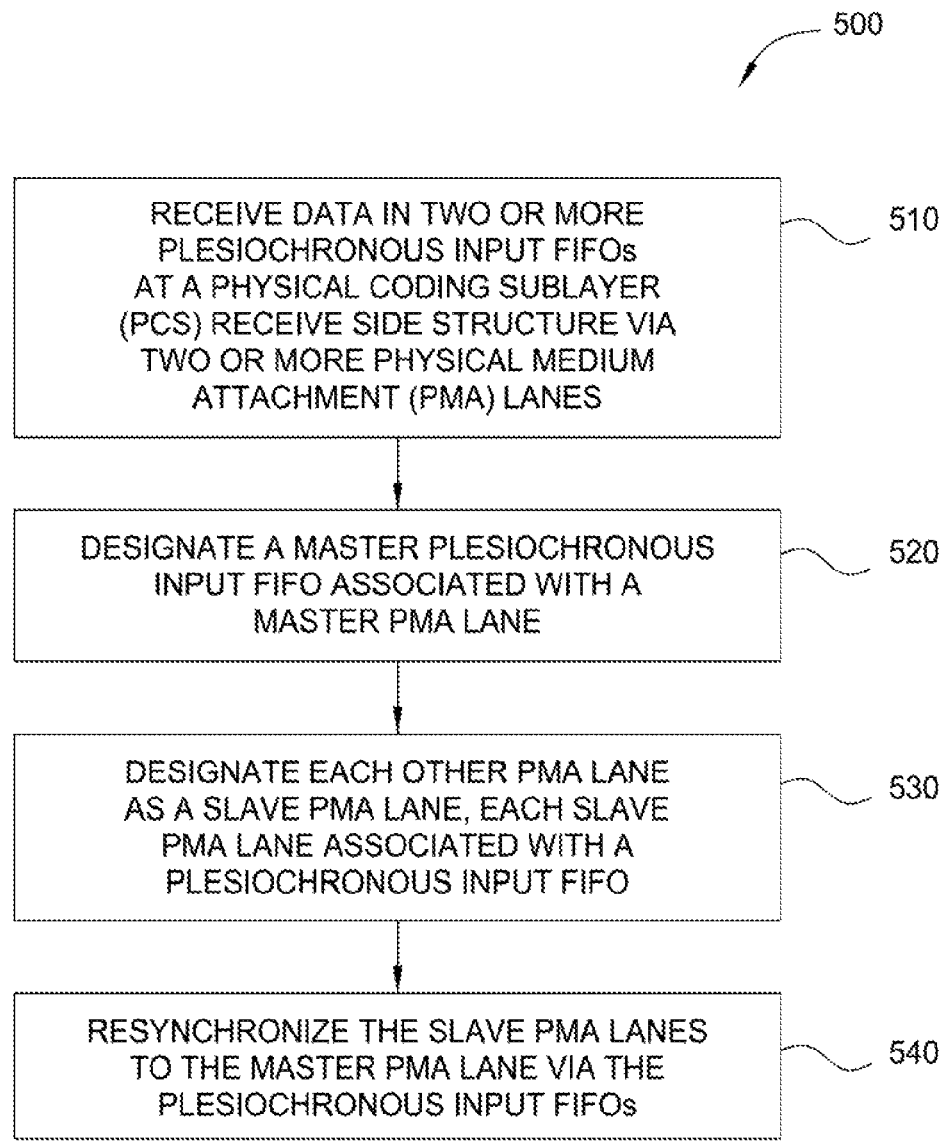
FIG. 5 is a flow diagram of method steps for reducing latency in Ethernet applications, according to one embodiment described herein.

FIG. 5 is a flow diagram of method steps 500 for reducing latency in Ethernet applications, according to one embodiment of the present invention. Although the method steps are described in conjunction with FIGS. 1-3, persons skilled in the art will understand that any system configured to perform the method steps, in any order, falls within the scope of the present invention. In various embodiments, the hardware and/or software elements described above in FIGS. 1-3 can be configured to perform the method steps of FIG. 5.

As shown, a method 500 begins at step 510, where two or more plesiochronous input FIFOs receive data at a PCS receive side structure via two or more PMA lanes. As illustrated in the example embodiment of FIG. 3, four PMA lanes and four plesiochronous input FIFOs are shown. The PMA lanes transmit data, but the four lanes do not necessarily have aligned clock edges for their clock cycles due to the variable skew in the system.

At step 520, a master plesiochronous input FIFO associated with a master PMA lane is designated. In the example of FIG. 2, PMA lane 0 is the master lane.

At step 530, the other PMA lanes are designated slave PMA lanes, and each of these lanes is also associated with a plesiochronous input FIFO. PMA lanes 1, 2, and 3 in FIG. 3 are plesiochronous with PMA lane 0.

At step 540, the pleisochronous input FIFOs resynchronize the slave PMA lanes to the master PMA. Therefore, the data from the four lanes will be in sync for the next processes in the system, such as PMA Bit Demux as shown in FIG. 3.

Latency is reduced in certain of the above-described embodiments by reducing the number of asynchronous clock domains to avoid long latencies caused by asynchronous FIFO crossings. In addition, latency is further reduced by reducing the number of data buffering points. On the transmit side, certain embodiments only buffer data for block distribution and alignment marker generation and insertion, and do not need to buffer data for transmitting the data across a clock boundary crossing. Likewise, on the receive side, large data buffers are not needed to buffer data at clock boundary crossings.

While the foregoing is directed to embodiments of the present invention, other and further embodiments of the invention may be devised without departing from the basic scope thereof, and the scope thereof is determined by the claims that follow.

What is claimed is:

1. A method comprising:
   receiving data at a physical coding sublayer (PCS) from a media access control (MAC) sublayer, wherein the MAC sublayer utilizes a first clock domain operating at a first clock frequency;
   performing one or more functions in the PCS on the data in the first clock domain;
   after performing one or more functions in the PCS, transmitting the data on one or more physical medium attachment (PMA) lanes coupled to the PCS, wherein the one or more PMA lanes utilize a second clock domain operating at a second clock frequency, wherein the first clock frequency and the second clock frequency have a fixed ratio, and wherein transmitting data from the first clock domain to the second clock domain comprises determining, based on the fixed ratio, a first portion of a received data block to transmit during a clock cycle and a second portion of the received data block to delay transmitting until a subsequent clock cycle; and
   performing one or more functions in the PCS on the data in the second clock domain.

2. The method of claim 1, wherein performing one or more functions on the data in the first clock domain comprises encoding and scrambling the data to create one or more 66-bit blocks.

3. The method of claim 1, further comprising:
   after performing one or more functions on the data in the second clock domain, transmitting the data to an asynchronous output first-in, first-out (FIFO) located in the first clock domain in the PCS.

4. The method of claim 1, wherein performing one or more functions on the data in the first clock domain comprises inserting one or more alignment markers in the data.

5. The method of claim 4, wherein performing one or more functions on the data in the second clock domain comprises removing one or more alignment markers in the data.

6. The method of claim 1, further comprising transmitting data from a transmit side of the PCS to a receive side of the PCS via one or more PMA lanes.

7. The method of claim 6, wherein the data is received from the one or more PMA lanes in one or more plesiochronous input FIFOs on the receive side of the PCS.

8. The method of claim 7, wherein the data in a subset of the plesiochronous input FIFOs is synchronized to the data in one of the plesiochronous input FIFOs that is designated as a master.

9. The method of claim 1, wherein performing one or more functions on the data in the second clock domain comprises deskewing the data.

* * * * *